Patent Office text …

3,150,985
DEHYDRATED FRIED MEAT CAKES
Rosario Buscemi, Niles, and Justin M. Tuomy, Oak Lawn, Ill., assignors to the United States of America as represented by the Secretary of the Army
No Drawing. Filed July 31, 1962, Ser. No. 213,831
22 Claims. (Cl. 99—208)
(Granted under Title 35, U.S. Code (1952), sec. 266)

The invention described herein, if patented, may be manufactured and used by or for the Government for governmental purposes, without the payment to us of any royalty thereon.

This invention relates to the production of dehydrated fried meat cakes, produced from precooked meat of warm-blooded animals or from precooked marine animals (e.g., fish), which are capable of instantaneous rehydration to provide a food product having the appearance, taste and flavor of freshly prepared fried meat cakes or fish cakes without need for additional heat processing.

This application is a continuation-in-part of our copending application Serial No. 112,482, filed April 11, 1961 (now abandoned), which relates to the production of dehydrated fried flaked fish cakes, capable of instantaneous rehydration to provide a food product having the appearance, taste and flavor of a freshly prepared fried fish cake without need for additional heat processing.

The dehydrated fried meat cakes in accordance with the present invention are precooked freeze-dehydrated comminuted fried meat cakes which can be rehydrated with hot or even with cold water for immediate consumption. When rehydrated with hot water, they will instantly furnish a meat dish having the appearance, taste and flavor of a freshly prepared fried meat cake, without need for additional heat processing.

In accordance with the present invention, there can be produced dehydrated meat cakes of the hamburger or pork sausage type which are characterized by a rather firm interior, or dehydrated products of the croquette type (ham croquettes, etc.) as well as dehydrated fish cakes which have a firm crust and soft interior. These variations are obtained by suitable proportioning of meat and vegetable components and preparation procedures, as will be more fully explained in this specification.

Insofar as we are aware there are not now on the market, or otherwise available to military and civilian consumers, dehydrated fried fish cakes, or dehydrated fried meat cakes of the hamburger or croquette type made from warm-blooded animal meat. The present invention enables the provision of dehydrated fried meat cakes which can be rehydrated in a field mess or by the individual soldier, simply by the addition of hot water, and within a few (say about 15–20) seconds reconstitute to an appetizing, tasty and nourishing dish. This is obviously very important, in that a dehydrated food product that is lacking quick reconstitution properties, and/or falls short of the appearance and flavor of an ordinary freshly prepared popular food dish, will not be accepted by the soldier in the field, and will quickly find its way into the garbage can or garbage trench. This would be an all-around waste from the logistical standpoint, as the production cost of the item and its transportation to a forward area would be unproductive, and the soldier would miss his meal.

Similar advantages of an acceptable dehydrated food item, and corresponding disadvantages of a dehydrated food item which falls short of complete acceptability, exist in the civilian food marketing system.

Accordingly, it is a principal object of our invention to provide dehydrated precooked meat products which will closely resemble the original cooked products after rehydration, particularly in taste and texture.

Another object of our invention is to provide dehydrated precooked meat products which will rehydrate instantaneously or nearly instantaneously in hot water.

A further object is the provision of dehydrated precooked meat products with the characteristic crust of fried products maintained after rehydration.

Still another object is the production of dehydrated precooked meat products which, when properly protected from oxygen and moisture in storage, will maintain their consumer acceptability under adverse storage conditions.

Yet a further advantage of our invention is that our dehydrated precooked meat products can be produced from commonly available raw materials and with conventional food machinery, without need for special retraining of operators.

A still further advantage of our invention is a versatile process that can be adapted to a large variety of meat cake products, so as to enable the production of a varied line of dehydrated meat products, which is of great importance, for instance, in isolated outposts where food monotony would be highly objectionable.

A further military advantage of our invention, which is also of applicability in the civilian field (e.g., camping and scouting), is that the dehydrated meat products of our invention can be rehydrated with cold water or even eaten dry, although such a mode of consumption is of course less palatable than in the case of rehydration with hot water.

Other objects and advantages of our invention will be readily apparent from its following description.

The meat cakes of the present invention are produced by mixing comminuted precooked meat, either fish, or the flesh of a warm-blooded animal (such as beef, pork, veal, ham, poultry, lamb) with a precooked starchy vegetable component, preferably corn meal, for which flour, starch, oatmeal, and/or potato material may be substituted in whole or in part; or pregelatinized corn flour (commercial grade) may be used without precooking. The components are mixed in a proportion of about 1–40 parts by weight of vegetable component to about 60–99 parts by weight of meat components per 100 parts by weight of meat and vegetable component mixture. The term "meat" as used in the specification and claims also includes "fish" unless a different meaning is obvious from the context.

Within the foregoing broad range, the percentage of the starchy vegetable component is varied in accordance with the type of desired end product. Thus, for a fish cake, a desirable proportion of the starchy vegetable component is about 10–40 parts by weight of said vegetable component per 100 parts of fish and vegetable mixture. In the case of meat cakes made from the meat of warm-blooded animals, the percentage of the starchy vegetable component is about 1–3 parts to 99–97 parts of meat component if a hamburger or pork sausage product is desired, while in the case of croquette-type products, the percentage of starchy vegetable component is preferably about 3–20 parts to 97–80 parts of meat. The mixture of precooked components is then formed into cakes of the desired shape, such as discs, spheres, etc., and fried (e.g., by deep-fat frying, or broiling) until a porous crust of the desired consistency (lightness in the case of hamburger or pork sausage meat, or firmness in the case of a croquette-type product or fish cake) is formed. The fried meat cakes are freeze-vacuum dehydrated to a moisture content below 4% (preferably about 1 to 2%) in accordance with techniques well understood in the art, and finally, are preferably canned or otherwise hermetically sealed in the absence of atmospheric oxygen (vacuum, or inert gas such as CO or $N_2$).

The resulting product is quite storage-stable, especially when packed in the absence of atmospheric oxygen, and rehydratable with hot water within a few seconds to the likeness of a freshly fried meat cake, without further cooking or frying. Rehydration instantly penetrates through the crust so as to penetrate the underlying dehydrated component evenly.

We will now proceed to disclose several specific examples of the production of dehydrated meat cakes in accordance with the above-described principles. It will be understood, of course, that the above-enumerated and other advantages of our invention may also be accomplished by suitable variations of the detailed method steps, about to be set forth below, which are intended to be for illustrative purposes, and not for the purpose of limiting the scope of our invention.

EXAMPLE I

*Dehydrated Precooked Fish Cakes*

Fresh frozen haddock blocks are steam-cooked (about 210° F., no pressure) for about 40 minutes. Cooking shrinkage is approximately 44 percent. The cooked fish is cooled and broken up into flakes.

16 oz. of degerminated yellow corn meal are dispersed in 32 oz. of cold water. The corn-meal slurry, 3 oz. of hydrogenated shortening, and suitable seasonings (say, 1½ oz. of salt, and ¾ oz. of dehydrated onion powder) are slowly added to 32 oz. of hot water with continuous stirring. This mixture is then cooked until it has the appearance of well-cooked corn-meal. 64 oz. of flaked fish, prepared as above, are then mixed with the corn-meal slurry.

Fish patties or fish balls are formed by hand or by machine to the desired size and shape. They are then deep-fat fried (French fried) at a temperature between about 350° to 450° F., preferably at the gentler temperature range at about 350°–375° F., until a porous crust of golden brown color is formed. The fish cakes are then drained and frozen.

The frozen fish cakes are then vacuum dehydrated by procedures generally known in the art wherein the frozen moisture (ice) is removed with sublimation. A recommended procedure is as follows: Vacuum of about .5 to 1.5 mm. (say, about .75–1 mm.) of mercury absolute; temperature about 110° F., time of dehydration approximately 12 hours. In a variant from the above procedure, the fish cakes were placed on suspended trays between radiant heating plates at a plate temperature of 160° F. under the same vacuum conditions as above, and for a dehydration time of about 5 to 6 hours. The moisture content of dehydrated product is below 4%, and may be as low as a trace; about 1 to 2% moisture content is presently preferred.

If it is intended to store the dehydrated fish cakes over an extended period of time, they should be packed in the absence of atmospheric oxygen, e.g., canned with a high vacuum (say, of the order of about 26–27 inches of mercury) or in the presence of an inert gas, such as carbon dioxide or (preferably) nitrogen. In lieu of a can, flexible plastic waterproof hermetically heat-sealable pouches, e.g., of polyethylene terephthalate ("Mylar") may be employed, with the exclusion of atmospheric oxygen. Even though ordinary fish products are known to be notoriously storage-unstable, we have successfully kept our product under these conditions for over one year at semi-tropical storage temperatures of the order of 100° F. Some samples were removed from storage after 9 months, and were found completely acceptable in appearance, texture, and flavor, after rehydration.

As heretofore indicated, rehydration is instantaneous upon addition of hot water (e.g., about 170° to 212° F.), which can be done in a sauce pan or canteen cup, if desired. The hot water can be obtained by the individual soldier by the use of ordinary heat tablets (e.g., trioxane tablets) even under front line combat conditions. Rehydration time is a matter of seconds, say about 5 to 20 (e.g., 10) seconds. In fact, soaking of the fish cakes for a minute or more makes them somewhat soggy, and they therefore should be drained at once.

EXAMPLE II

*Dehydrated Precooked Hamburger Patties*

The following ingredients are added to 18 lbs., 3 oz. of water in a steam jacket kettle with constant mixing:

| | |
|---|---|
| Corn meal, yellow, degerminated, enriched | 1 lb. |
| Shortening | 2 lbs. 3 oz. |
| Salt | 11 oz. |
| White ground pepper | 1.5 oz. |
| Dehydrated onion powder | 8.5 oz. |

The mixture is slowly heated until a smooth, gelatinized texture is obtained with no hard particles. The cooked mixture is not allowed to cool completely before it is added to the raw beef.

77 lbs. 5 oz. of uncooked beef, canner cutter grade or utility grade, are ground through a ½ inch plate. The cooked corn meal mixture is spread over the ground beef and the batch reground through a 3/16 inch plate with care being taken to assure uniform distribution of the corn meal throughout the beef. Immediately after grinding, the meat mixture is spread on trays e.g., to a thickness of not more than 4 inches and placed in a 40° F. cooler overnight. We prefer that this mixture should contain about 15–20% fat. If the meat is too lean to yield such a fat content for the mixture, added fat can be supplied preferably by adding it to the beef prior to the first grinding. More than about 25% fat content interferes with rehydratability and is therefore undesirable. The weight of this fat component is included in the 77 lbs. 5 oz. weight of the beef in this example. The cold beef and corn meal mixture is then formed into patties 3" by ½" or other desired size and shape, either by hand or on a patty-forming machine.

The patties or cakes are then fried in deep fat at about 225° to 350° F. just until the inside is cooked to a light pink or grayish color and a light porous crust is formed on the outside. About 1½ minutes frying time is usually sufficient to accomplish this. Overfrying is undesirable as this will result in the formation of a heavy, non-porous crust which slows up the rehydration of the dehydrated product and diminishes the resemblance of the rehydrated product to a freshly fried product. After removal from the frying pan, the patties are drained of excess fat, if any, and frozen in a blast freezer to about 10° F. The patties are then freeze-vacuum dehydrated, in accordance with recognized freeze-vacuum dehydration techniques at a plate temperature of about 110° F. and a vacuum of about 750–1000 microns to a moisture content of about 2%. Preferably an inert gas such as nitrogen or carbon dioxide is used to break the dehydrator vacuum. The dehydrated hamburger patties are then preferably sealed in vacuum cans, filled with an inert gas such as nitrogen or $CO_2$.

Rehydration of the hamburger patties is effected in a manner corresponding to that set forth in Example I, and the resulting product is a dehydrated hamburger cake of a texture, flavor and appearance substantially corresponding to that of a familiar freshly fried hamburger.

EXAMPLE III

*Dehydrated Precooked Pork Sausage Patties*

Example II is repeated with the following formulation:

| | | |
|---|---|---|
| Pork trimming (15–25% fat) | oz | 64 |
| Water | oz | 16 |
| Corn meal | oz | 1 |
| Salt | grams | 20 |
| Pepper (black) | do | 2 |
| Sage (ground) | do | 5 |

The above mixture is prepared from a slurry of the corn meal, spices and water (no meat), made up and cooked as in Example II. The slurry is then mixed with the uncooked pork trimmings that have been ground through a coarse plate (½ inch). The mixture is reground, preferably through a 3/16 inch plate, and kept below about 40° F. during this stage of the processing, but without freezing it at this point. The patties are then formed, fried, and freeze-vacuum dehydrated as in Example II. The resulting dehydrated product preferably has a moisture content of 1–2%, and is preferably packed in vacuum can in the presence of an inert gas. Rehydration is accomplished as in Examples I and II, and yields substantially the equal of a freshly prepared pork sausage cake or patty.

EXAMPLE IV

Dehydrated Precooked Poultry Croquettes

A formulation of the following ingredients:

| | | |
|---|---|---|
| Chicken meat (cooked) | oz | 48 |
| Corn meal | oz | 6 |
| Water | oz | 48 |
| Chicken soup and gravy base | grams | 38 |
| Onion (minced, dehydrated) | do | 20 |
| Parsley (crushed, dehydrated) | do | 2 |
| Pepper (white) | do | 1 |
| Salt | do | 30 |
| Shortening | do | 70 | is prepared by mixing the above ingredients, except the chicken meat, and by cooking as in Example II. The cooked mixture which is in the form of a slurry, is then added to the comminuted cooled (but unfrozen) chicken meat component, and the mixture is reground through a ½ inch plate. The reground batch is then formed into patty-shaped croquettes, fried until a firm crust is formed, preferably by deep-fat frying (at about 375 to 400° F.), and is then freeze-vacuum dehydrated as in Example II.

Packing and rehydration is accomplished as in Example II. The rehydration product is substantially equal to a familiar freshly prepared chicken croquette with its characteristic firm crust and soft meaty interior.

Dehydrated turkey croquettes can be made by substituting the same proportion of comminuted precooked turkey meat for the comminuted chicken meat of this example.

EXAMPLE V

Dehydrated Precooked Ham Croquettes

A formulation composed of the following ingredients:

| | |
|---|---|
| Ham (commercial fully cooked) | 22 lbs. |
| Corn meal | 2 lbs. 8 oz. |
| Water | 20 lbs. 12 oz. |
| Onion (chips), dehydrated | 3.7 oz. |
| Parsley (dried, ground) | 9.8 grams. |
| Pepper (white) | 4.9 do. |
| Mustard seed (ground) | 1.5 do. |
| Cloves (ground) | 1.5 do. | is prepared by making up a slurry of the above ingredients, except the ham component, and cooking the same to the appearance of a well-cooked corn-meal slurry. The precooked ham component is ground through a ¼ inch plate, and mixed with the corn-meal slurry in a cool room, and reground through a ⅛ inch plate. The mixture is then formed into patties or balls, by hand or by machine, and the patties or balls are then fried to acquire a firm crust, preferably by deep-fat frying at about 375–400° F. in accordance with Example IV. Freeze-vacuum dehydration, packing and rehydration of the fried ham patties or balls are then effected as in Example IV and the resulting rehydrated dish is substantially equal to the familiar fresh ham croquette.

Chopped precooked lamb or veal may be substituted for the chopped ham of this example to produce dehydrated lamb or veal croquettes.

The preferred ratio of meat to starchy vegetable component to obtain optimum taste and texture acceptability of the rehydration products of the dehydrated meat croquettes of Examples IV and V is about 3–11 parts by weight of meat to 97–89 parts by weight of vegetable component per 100 parts by weight of meat and vegetable mixture; however, the proportion of the vegetable component in the meat-vegetable croquette mix may be increased to about 20 parts by weight per 80 parts by weight of meat component, which will yield a less "meaty" but still quite taste-satisfying rehydration product of the dehydrated croquettes. In that last-mentioned variation, the cornmeal component is about twice the amount indicated in Examples IV and V.

While the foregoing Examples I to V indicate the use of precooked corn meal as the starchy vegetable component, it is feasible to substitute therefor an approximately equal proportion of pregelatinized corn flour, without precooking it.

While the foregoing general description of our invention and the just-recited examples use the term meat or fish "cake," it will be understood that the latter term is used in a general sense and encompasses a number of geometrical configurations, such as discs (patties), spheres (balls), or other suitable shapes. Likewise, the practice of our invention, as regards fish cakes, is not confined to the use of haddock, as mentioned in Example I, but extends to numerous other fish, such as salmon, tuna, codfish, etc., and other edible marine animals (e.g., crabs, shrimp, etc.). In the case of fish having an excessive amount of natural oil (as for instance some varieties of tuna), the cooking should be sufficiently long continued to remove the excess oil.

Likewise, while Example I indicates a weight ratio of fish to corn meal of about 80:20 (on the basis of dry corn meal), we have found that these ratios can be substantially varied, within the weight ratio of from about 60 to about 90 parts of cooked fish to about 40 to about 10 parts of corn meal (on a dry basis for the latter) per 100 parts of mixture. In other words, the proportion of fish meat will be in excess of corn meal; conversely, the proportion of corn meal will be at least about 10% by weight (on a dry basis) of the amount of fish and vegetable mixture. Otherwise expressed, the ratio of fish to starchy vegetable (e.g., corn meal) component is about 1.5–10 parts of the former per 1 part of the latter (on a dry basis).

If the meat component is the meat of a warm-blooded animal, the proportion of meat component is ordinarily higher, i.e., about 80 to 97 parts by weight of precooked meat to 20 to 3 parts by weight of corn meal (or other starchy vegetable components) per 100 parts of mixture for making croquette-type dehydrated meat cakes; and still higher for meat cakes of the hamburger and sausage cake type, wherein the proportion of uncooked meat component is preferably about 97 to 99 parts by weight of meat to about 3 to 1 parts by weight of starchy vegetable component (e.g., corn meal) per 100 parts of mixture. A suitable amount of cooked potato or other edible starchy particulate material may be added to the corn meal, if desired, or may be entirely substituted therefor, within the foregoing proportions. While deep fat frying (French frying) is our preferred method of heat-processing the meat cakes prior to freeze-vacuum dehydration, other methods of frying, such as pan frying or infra-red broiling, may be used instead. The frying step is sufficient to heat-process the mixture, even in those instances where the meat component or the starchy vegetable component, or both, are in the uncooked state prior to frying, as indicated.

It will thus be seen that we have provided a simple and highly efficient method of providing a wide variety of instantly rehydratable freeze-vacuum dehydrated fried meat cakes. The resulting products are highly palatable and can be prepared even under rugged field conditions, so long as some water (preferably hot) is available. They also may be eaten dry.

We wish to be understood that departures and changes from the operative conditions set forth in the foregoing specification will readily occur to the expert and are therefore deemed within the scope of our invention, which we now proceed to define by the appended claims.

We claim:

1. Process of making dehydrated fried meat cakes comprising uniformly mixing comminuted meat with a water slurry of a particulate starchy vegetable component consisting essentially of comminuted corn, in a proportion of about 60–99 parts by weight of meat to about 40–1 part by weight of said vegetable component, forming said mixture into meat cakes, frying said meat cakes to form a porous crust thereon, and freeze-vacuum-dehydrating said fried meat cakes to a moisture content below about 4%; whereby instantly rehydratable storage-stable shape-sustaining dehydrated fried meat cakes are obtained, which upon rehydration have the appearance, texture and flavor of freshly prepared meat cakes.

2. Process according to claim 1, wherein said vegetable component is cooked corn meal.

3. Process according to claim 1, wherein said vegetable component is pregelatinized corn flour.

4. Process according to claim 1, wherein said meat cakes are deep fat fried prior to freeze-vacuum dehydration.

5. Process according to claim 1, wherein said meat cakes are dehydrated to a moisture content not exceeding about 2%.

6. Process according to claim 1, wherein said dehydrated meat cakes are packaged in the absence of atmospheric oxygen.

7. Process of making dehydrated fish cakes comprising uniformly mixing comminuted cooked flaked fish with a water slurry of a particulate starchy vegetable component consisting essentially of comminuted corn, in a proportion of about 60–90 parts by weight of fish to about 10–40 parts by weight of said vegetable component, forming said mixture into fish cakes, frying said fish cakes to form a porous crust thereon, and freeze-vacuum dehydrating said fried fish cakes to a moisture content below about 4%; whereby instantly rehydratable storage-stable shape-sustaining dehydrated fried fish cakes are obtained, which upon rehydration have the appearance, texture and flavor of freshly prepared fish cakes.

8. Process according to claim 7, wherein said starchy vegetable component is cooked corn meal.

9. Process according to claim 8, wherein the weight ratio of fish to corn meal is about 80 parts of fish to about 20 parts of corn meal.

10. Process of making dehydrated meat croquettes, comprising uniformly mixing comminuted cooked meat with a water slurry of a particulate starchy vegetable component consisting essentially of comminuted corn, in a proportion of about 80–97 parts by weight of meat to about 20–3 parts by weight of said vegetable component, forming said mixture into croquettes, frying said meat croquettes to form a porous crust thereon, and freeze-vacuum-dehydrating said fried meat croquettes to a moisture content below about 4%; whereby instantly rehydratable storage-stable shape-sustaining dehydrated fried meat croquettes are obtained, which upon rehydration have the appearance, texture and flavor of freshly prepared meat croquettes.

11. Process according to claim 10, wherein said vegetable component is cooked corn meal and wherein the weight ratio of meat to corn meal is about 89–97 parts by weight of meat to about 11–3 parts by weight of corn meal.

12. Process according to claim 10, wherein said meat is poultry.

13. Process according to claim 10, wherein said meat is ham.

14. Process of making dehydrated hamburger patties, comprising uniformly mixing comminuted beef with a water slurry of a particulate starchy vegetable component consisting essentially of comminuted corn, in a proportion of about 97–99 parts by weight of beef to about 3–1 part by weight of said vegetable component, forming said mixture into hamburger patties, frying said hamburger patties to form a light porous crust thereon, and freeze-vacuum-dehydrating said fried hamburger patties to a moisture content below about 4%; whereby instantly rehydratable storage-stable shape-sustaining fried hamburger patties are obtained, which upon rehydration have the appearance, texture and flavor of freshly prepared hamburger patties.

15. Process of making dehydrated pork sausage patties, comprising uniformly mixing comminuted pork with a water slurry of a particulate starchy vegetable component consisting essentially of comminuted corn, in a proportion of about 97–99 parts by weight of pork to about 3–1 part by weight of said vegetable component, forming said mixture into pork sausage patties, frying said pork sausage patties to form a light porous crust thereon, and freeze-vacuum dehydrating said fried pork sausage patties to a moisture content below about 4%; whereby instantly rehydratable storage-stable shape-sustaining fried pork sausage patties are obtained, which upon rehydration have the appearance, texture and flavor of freshly prepared hamburger patties.

16. Process according to claim 14, wherein said vegetable component is cooked corn meal.

17. Process according to claim 15, wherein said vegetable component is cooked corn meal.

18. An instantly rehydratable storage-stable shape-sustaining prefried freeze-vacuum-dehydrated meat cake produced by the process of claim 1.

19. A dehydrated meat croquette produced by the process of claim 1, wherein said meat is in a proportion of about 80–97 parts by weight, and said vegetable component is in a proportion of about 20–3 parts by weight.

20. A dehydrated hamburger patty produced by the process of claim 1, wherein said meat is beef in a proportion of about 97–99 parts by weight, and said vegetable component is in a proportion of about 3–1 part by weight.

21. A dehydrated pork sausage patty produced by the process of claim 1, wherein said meat is pork in a proportion of about 97–99 parts by weight, and said vegetable component is in proportion of about 3–1 part by weight.

22. A dehydrated fish cake produced by the process of claim 7.

References Cited in the file of this patent

UNITED STATES PATENTS

| | | |
|---|---|---|
| 2,765,236 | Blaine | Oct. 2, 1956 |
| 3,083,108 | Kline et al. | Mar. 26, 1963 |

OTHER REFERENCES

Tappel et al.: "Food Technology," November 1957, pages 599 to 603.

"Everybody's Cook Book," 1924, 1st ed., by I. E. Lord, pages 331 and 356.

UNITED STATES PATENT OFFICE

CERTIFICATE OF CORRECTION

Patent No. 3,150,985            September 29, 1964

Rosario Buscemi et al.

It is hereby certified that error appears in the above numbered patent requiring correction and that the said Letters Patent should read as corrected below.

Column 2, line 69, for "CO or $N_2$" read -- $CO_2$ or $N_2$ --; column 8, lines 33 and 34, for "hamburger" read -- pork sausage --.

Signed and sealed this 26th day of January 1965.

(SEAL)
Attest:

ERNEST W. SWIDER
Attesting Officer

EDWARD J. BRENNER
Commissioner of Patents